US010889697B2

(12) United States Patent
Tynys et al.

(10) Patent No.: US 10,889,697 B2
(45) Date of Patent: Jan. 12, 2021

(54) POLYETHYLENE COMPOSITION FOR PIPE APPLICATIONS WITH IMPROVED SAGGING AND EXTRUSION PROPERTIES

(71) Applicants: Abu Dhabi Polymers Co. Ltd. (Borouge) L.L.C., Abu Dhabi (AE); Borealis AG, Vienna (AT)

(72) Inventors: Antti Tynys, Abu Dhabi (AE); Mohana Murali Adhyatma Bhattar, Abu Dhabi (AE); Jarmo Harjuntausta, Abu Dhabi (AE)

(73) Assignees: ABU DHABI POLYMERS CO. LTD (BOROUGE) L.L.C., Abu Dhabo (AE); BOREALIS AG, Vienna (AT)

(*) Notice: Subject to any disclaimer, the term of this patent is extended or adjusted under 35 U.S.C. 154(b) by 0 days.

(21) Appl. No.: 15/526,951

(22) PCT Filed: Mar. 22, 2016

(86) PCT No.: PCT/EP2016/000498
§ 371 (c)(1),
(2) Date: May 15, 2017

(87) PCT Pub. No.: WO2016/206768
PCT Pub. Date: Dec. 29, 2016

(65) Prior Publication Data
US 2018/0282504 A1    Oct. 4, 2018

(30) Foreign Application Priority Data

Jun. 22, 2015 (EP) .................... 15001844

(51) Int. Cl.
| | | |
|---|---|---|
| C08J 3/20 | (2006.01) |
| C08K 3/04 | (2006.01) |
| F16L 11/04 | (2006.01) |
| C08F 210/16 | (2006.01) |
| C08L 23/08 | (2006.01) |
| C08L 23/06 | (2006.01) |
| C08L 23/04 | (2006.01) |
| F16L 9/12 | (2006.01) |

(52) U.S. Cl.
CPC .............. *C08K 3/04* (2013.01); *C08F 210/16* (2013.01); *C08J 3/203* (2013.01); *C08L 23/04* (2013.01); *C08L 23/06* (2013.01); *C08L 23/0815* (2013.01); *F16L 11/04* (2013.01); *C08J 2323/08* (2013.01); *C08L 2203/18* (2013.01); *F16L 9/12* (2013.01)

(58) Field of Classification Search
CPC ...... C08F 10/02; C08F 110/02; C08F 210/16; C09D 123/04; C09D 123/06; C09D 7/1216; C09D 123/0815; C08L 23/06; C08L 23/0815; C08L 2203/18; C08L 23/04; C08L 23/08; C08L 23/0807; Y10S 138/07

USPC .................. 525/240; 524/570; 138/118, 145
See application file for complete search history.

(56) References Cited

U.S. PATENT DOCUMENTS

| | | | | |
|---|---|---|---|---|
| 4,973,626 A | * | 11/1990 | Wilkus ...................... | C08L 7/00 525/104 |
| 2002/0045711 A1 | * | 4/2002 | Backman ................ | C08F 10/02 525/240 |
| 2008/0142433 A1 | * | 6/2008 | McManus .......... | B01D 39/1623 210/500.1 |

FOREIGN PATENT DOCUMENTS

| | | |
|---|---|---|
| EP | 2 860 200 A1 | 5/2006 |
| EP | 2 570 455 A1 | 1/2007 |
| EP | 2570455 A1 * | 3/2013 .............. C08L 23/04 |
| EP | 2860200 A1 | 4/2015 |
| EP | 2860202 A1 | 4/2015 |

(Continued)

OTHER PUBLICATIONS

Tolinki, M. Additives for Polyolefins, 2nd Ed. (Year: 2015).*
International Search Report dated Feb. 3, 2016 from PCT/EP2016/000498.
Business Wire, "Qenos' Alkadyne® PE 100 Pipe Resin Produced with Univation PRODIGY™ Bimodal HDPE Technology Receives European and ISO Certifications," Collaboration Yields High-Performance in Challenging Applications, Jul. 17, 2015, Business Wire, Houston & Melbourne, Australia.

(Continued)

*Primary Examiner* — Lee E Sanderson
(74) *Attorney, Agent, or Firm* — Fay Sharpe LLP

(57) ABSTRACT

The present invention relates to a polyethylene composition comprising, a base resin (A) comprising a copolymer of ethylene and at least one comonomer selected from alpha-olefins having from three to twelve carbon atoms, wherein the ethylene copolymer comprises a low molecular weight component (A-1) and a high molecular weight component (A-2) with the low molecular weight component (A-1) having a lower weight average molecular weight than the high molecular weight component (A-2), (B) carbon black in an amount of 1.0 to 10 wt % based on the total amount of the polyethylene composition, and (C) optional further additives other than carbon black; wherein the low molecular weight component (A-1) has a melt flow rate $MFR_2$ (190° C., 2.16 kg) of equal to or more than 150 g/10 min to equal to or less than 400 g/10 min, determined according to ISO 1133, the base resin (A) has a density of equal to or more than 943 kg/m³ to equal to or less than 957 kg/m³, determined according to ISO 1183, and the composition has a melt flow rate $MFR_5$ (190° C., 5 kg) of equal to or more than 0.14 g/10 min to equal to or less than 0.30 g/10 min, determined according to ISO 1133, a viscosity at a constant shear stress of 747 Pa, $eta_{747}$, of equal to or more than 800 kPa*s to equal to or less than 1300 kPa*s, and complies with the in-equation (I) $eta_{747} > -1800 \times MFR_5 + 1200$ (I), a process for producing said polyethylene composition and an article comprising said polyethylene composition.

20 Claims, No Drawings

(56) References Cited

FOREIGN PATENT DOCUMENTS

| EP | 2860204 A1 | 4/2015 | | |
|----|----|----|----|----|
| EP | 2894195 A1 | 7/2015 | | |
| WO | WO 99/51646 | 10/1999 | | |
| WO | WO 00/22040 | 4/2000 | | |
| WO | WO 2000/022040 A1 | 4/2000 | | |
| WO | WO 2013/037432 A1 | 3/2013 | | |
| WO | WO-2013101767 A2 * | 7/2013 | .............. | C08L 23/06 |
| WO | WO-2014095917 A1 * | 6/2014 | .............. | C08L 23/06 |
| WO | WO 2015/051881 A1 | 4/2015 | | |

OTHER PUBLICATIONS

Qenos PTY LTD, "Alkadyne® PE100 Product Brochure," full brochure, Victoria, Australia.
Qenos PTY LTD, "Alkadyne® HDF145B Technical Data Sheet High Density Polyethylene," Victoria, Australia.

\* cited by examiner

100. # POLYETHYLENE COMPOSITION FOR PIPE APPLICATIONS WITH IMPROVED SAGGING AND EXTRUSION PROPERTIES

This application is a 371 of PCT Patent Application Serial No. PCT/EP2016/000498, filed Mar. 22, 2016, which claims priority to European Patent Application Serial No. 15001844.8, filed Jun. 22, 2015.

The present invention relates to a polyethylene composition, particularly a polyethylene composition for pipe applications. The invention further relates to a process for the production of said polyethylene composition and an article, particularly a pipe, comprising said polyethylene composition.

BACKGROUND OF THE INVENTION

Pipes constructed from polymer materials have a multitude of uses, such as fluid transport, i.e. the transport of liquids, slurries and gases, e.g. water or natural gas. During transport, it is normal for the fluid to be pressurized. Moreover, the transported fluid may have varying temperatures, usually within the range from about 0° C. to about 50° C. Such pressurized pipes are preferably constructed from polyolefin plastics, usually unimodal or bimodal ethylene plastics such as medium density polyethylene (MDPE; density: 930-942 kg/m$^3$) and high density polyethylene (HDPE; density: 942-965 kg/m$^3$).

The expression "pressure pipe" used herein refers to a pipe which, when used, is subjected to a positive pressure, that is the pressure inside the pipe being higher than the pressure outside the pipe.

Polymeric pipes are generally manufactured by extrusion, or, to a small extent, by injection moulding. A conventional plant for extrusion of polymer pipes comprises an extruder, a die-head, a calibrating device, cooling equipment, a pulling device, and a device for cutting and/or for coiling up the pipe.

The manufacture of polyethylene materials for use in pressure pipes is discussed in an article by Scheirs et al (Scheirs, Böhm, Boot and Leevers: PE100 Resins for Pipe Applications, TRIP Vol. 4, No. 12 (1996) pp. 408-415). The authors discuss the production technology and properties of PE100 pipe materials. They point out the importance of proper comonomer distribution and molecular weight distribution in order to optimize slow crack growth and rapid crack propagation.

Whilst properties of conventional polymer pipes are sufficient for many purposes, enhanced properties may also be desired, for instance in applications requiring high pressure resistance, i.e. pipes that are subjected to an internal fluid pressure for long and/or short periods of time.

A problem when manufacturing large diameter pipes, particularly from multimodal polymer material, is that it is difficult to maintain uniform dimensions all over the pipe. This is due to gravity flow of the polymer melt, causing it to flow from the upper part of the pipe to the lower part (often called "sagging"). Thus, the wall thickness at the upper part of the pipe becomes smaller than at the lower part of the pipe. The sagging problem is particularly pronounced for thick-walled large diameter pipes, such as pipes with a wall thickness of at least 100 mm. In order to achieve minimum required wall thickness of the pipe on top of the pipe, pipe producers need to compensate the sagging by producing pipes which have thicker wall thickness in bottom of the pipe. This leads to additional production costs due to the needed extra material and non optimal final product quality.

The above described sagging problem has been discussed in German patent application DE 19604196 A1. It discloses a process to manufacture a large-bore, thick walled pipe of polyethylene. The pipe is extruded through a ring formed die and cooled on both inner and outer surfaces. This double sided cooling is said to eliminate the deformation of the pipe due to gravity-induced flow of the melt emerging from the die.

International patent application WO 00/22040 discusses the improvement of the polyethylene composition for addressing the sagging problem. It was said that a bimodal polyethylene composition with a high viscosity at a low shear stress of 747 Pa improves sagging behavior of the polymeric melt.

European patent application EP 13 006 049 discloses a polyethylene composition suitable for large diameter pipes which shows low sagging behavior shown by a high viscosity at a constant shear stress of 747 Pa. However, said polyethylene composition has a comparatively weak processability.

There is a need for polyethylene compositions especially for pressure pipe applications which show an improved balance of low sagging behavior and processability, so that they are suitable for large diameter pipes with wall thicknesses of at least 100 mm which can be extruded with existing extrusion lines and standard adjustments of die heads. The composition should further show a good balance of properties as regards mechanical properties and pressure resistance so that PE100 grades can be obtained.

SUMMARY OF THE INVENTION

The present invention relates to a polyethylene composition comprising, preferably consisting of,
a base resin (A) comprising
a copolymer of ethylene and at least one comonomer selected from alpha-olefins having from three to twelve carbon atoms,
wherein the ethylene copolymer comprises a low molecular weight component (A-1) and a high molecular weight component (A-2) with the low molecular weight component (A-1) having a lower weight average molecular weight than the high molecular weight component (A-2),
(B) carbon black in an amount of 1.0 to 10 wt % based on the total amount of the polyethylene composition, and
(C) optional further additives other than carbon black;
wherein the low molecular weight component (A-1) has a melt flow rate MFR$_2$ (190° C., 2.16 kg) of equal to or more than 150 g/10 min to equal to or less than 400 g/10 min, determined according to ISO 1133,
the base resin (A) has a density of equal to or more than 943 kg/m$^3$ to equal to or less than 957 kg/m$^3$, determined according to ISO 1183, and the composition has a melt flow rate MFR$_5$ (190° C., 5 kg) of equal to or more than 0.14 g/10 min to equal to or less than 0.30 g/10 min, determined according to ISO 1133, a viscosity at a constant shear stress of 747 Pa, eta$_{747}$, of equal to or more than 800 kPa*s to equal to or less than 1300 kPa*s, and complies with the in-equation (I)

$$eta_{747} [kPa*s] > -1800 \times MFR_5 [g/10 \, min] + 1200 \qquad (I)$$

with eta$_{747}$ referring to said viscosity at a constant shear stress of 747 Pa of the polyethylene composition and MFR$_5$ referring to said melt flow rate MFR$_5$ (190° C., 5 kg) of the polyethylene composition.

The polyethylene composition according to the invention surprisingly not only show a low sagging tendency as can be seen from a high viscosity at a low shear stress of 747 Pa, but also good processability and extrudability which can be seen from the melt flow rate $MFR_5$ and seen in the rheological properties such as a higher shear thinning index of the composition. Further the composition shows an improved balance of properties as regards mechanical properties, such as tensile properties, pressure resistance in the pressure pipe test. These properties enable the polyethylene composition of the present invention to be suitable for the production of thick-walled pipes, preferably with a wall thickness of 100 mm or more which preferably meet PE100 standards, with existing extrusion lines and standard adjustments of die heads.

The present invention further provides a polyethylene composition obtainable by a multistage process, the multistage process comprising a) polymerizing ethylene in the presence of a Ziegler-Natta catalyst for obtaining an intermediate material having a melt flow rate $MFR_2$ (190° C., 2.16 kg) of equal to or more than 150 g/10 min to equal to or less than 400 g/10 min, determined according to ISO 1133, b) transferring the intermediate material to a gas phase reactor
  (i) feeding ethylene and an alpha-olefin comonomer having from 3 to 12 carbon atoms to the gas phase reactor
  (ii) further polymerizing the intermediate material
to obtain a base resin (A) which comprises the intermediate material polymerized in step a) and a material polymerized in step b) which has a higher weight average molecular weight as the intermediate material of step a), wherein the base resin (A) has a density of equal to or more than 943 $kg/m^3$ to equal to or less than 957 $kg/m^3$, determined according to ISO 1183, c) extruding the base resin (A) in the presence of 1 to 10 wt % carbon black (B), based on the amount of the polyethylene composition, and optional further additive(s) (C), into a polyethylene composition having a melt flow rate $MFR_5$ (190° C., 5 kg) of equal to or more than 0.14 g/10 min to equal to or less than 0.30 g/10 min, determined according to ISO 1133, a viscosity at a constant shear stress of 747 Pa, $eta_{747}$, of equal to or more than 800 kPa*s to equal to or less than 1300 kPa*s, and complying with the in-equation (I)

$$eta_{747} > -1800 \times MFR_5 + 1200 \quad (I)$$

with $eta_{747}$ referring to said viscosity at a constant shear stress of 747 Pa of the polyethylene composition and $MFR_5$ referring to said melt flow rate $MFR_5$ (190° C., 5 kg) of the polyethylene composition.

In another aspect, the present invention relates to a process for producing the polyethylene composition according to the present invention, wherein the base resin (A) is produced in a multi-stage process comprising two reactors connected in series.

In a further aspect, the present invention provides an article comprising the polyethylene composition according to the present invention.

In yet a further aspect, the present invention is concerned with the use of the inventive polyethylene composition for the production of an article.

Thereby, it is preferred that the article relates to a pipe or a pipe fitting, more preferably a pipe with a large wall thickness such as at least 100 mm.

Definitions

A polyethylene composition according to the present invention denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

An ethylene copolymer denotes a polymer consisting of ethylene monomer units and comonomer units in an amount of at least 0.1 mol %. In an ethylene random copolymer the comonomer units are randomly distributed in the polymer chain.

The term 'base resin (A)' denotes the polymeric component of the composition.

The term 'different' denotes that a polymeric component differs from another polymeric component in at least one measurable property. Suitable properties for differentiating polymeric components are weight average molecular weight, melt flow rate $MFR_2$ or $MFR_5$, density or comonomer content.

General

Base Resin (A)

The base resin (A) comprises a copolymer of ethylene and at least one comonomer selected from alpha-olefins having from three to twelve carbon atoms (referred herein also as ethylene copolymer).

Preferably the alpha olefin comonomers of the ethylene copolymer are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-hexene.

The ethylene copolymer may further comprise further comonomer units different from alpha olefin comonomers such as dienes, polar comoners or silicon containing comonomers. It is, however, preferred that the ethylene copolymer only contains alpha olefin monomers as comonomer units.

The ethylene copolymer comprises a low molecular weight component (A-1) and a high molecular weight component (A-2). The low molecular weight component (A-1) differs from the high molecular weight component (A-2) by having a lower weight average molecular weight.

Preferably the base resin consists of the copolymer of ethylene and at least one comonomer, more preferably one comonomer, selected from alpha-olefins having from three to twelve carbon atoms.

The ethylene copolymer may further comprise further polymer component(s) different to the low molecular weight component (A-1) and the high molecular weight component (A-2). The further polymer component(s) can be introduced to the ethylene copolymer, the base resin or the polyethylene composition either by melt mixing or compounding or in an additional reaction stage of the multi-stage process for producing base resin of the polyethylene composition.

Components (A-1) and (A-2) differ in their weight average molecular weight in that that component (A-2) has a higher weight average molecular weight as component (A-1). The differences in weight average molecular weight can be seen from the melt flow rate $MFR_2$ of component (A-1) which is higher than the melt flow rate $MFR_5$ of the polyethylene composition.

The $MFR_2$ (2.16 kg, 190° C.) of component (A-1) is equal to or more than 150 g/10 min, preferably equal to or more than 175 g/10 min, more preferably equal to or more than 200 g/10 min, most preferably equal to or more than 220 g/10 min.

Further, the $MFR_2$ (2.16 kg, 190° C.) of component (A-1) is equal to or less than 400 g/10 min, preferably equal to or less than 380 g/10 min, more preferably equal to or less than 360 g/10 min.

Component (A-1) can be a homopolymer or copolymer of ethylene.

Component (A-1) in one embodiment can be a copolymer of ethylene with one or more alpha-olefins having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

The ethylene copolymer of component (A-1) preferably has a density of equal to or more than 955 $kg/m^3$ and of equal to or less than 965 $kg/m^3$, more preferably of equal to or more than 963 $kg/m^3$, and most preferably of equal to or more than 961 $kg/m^3$.

However, it is preferred that component (A-1) is an ethylene homopolymer. The homopolymer preferably has a density of at least 970 $kg/m^3$ and preferably of more than 970 $kg/m^2$.

Further, component (A-1) is preferably present in the base resin in an amount of 40 to 55 wt.-%, more preferably 43 to 53 wt.-%, most preferably 45 to 51 wt.-%, with respect to the base resin.

The high molecular weight component (A-2) is preferably a copolymer of ethylene and at least one alpha-olefin comonomers, preferably one alpha-olefin comonomer, with 3 to 12 carbon atoms.

Thereby, the alpha-olefin comonomer(s) used in the ethylene/alpha-olefin copolymer of the high molecular weight component (A-2) preferably are different to that/those used in the optional ethylene/alpha-olefin copolymer of the low molecular weight component (A-1).

Preferably the alpha olefin comonomer(s) of component (A-2) is/are selected from alpha olefins having from 4 to 8 carbon atoms, such as 1-butene, 1-hexene, 4-methyl-1-pentene and 1-octene. Especially preferred are 1-butene and 1-hexene and mostly preferred is 1-hexene.

Component (A-2) may further comprise further comonomer units different from alpha olefin comonomers such as dienes, polar comonomers or silicon containing comonomers. It is, however, preferred that the component (A-2) only contains alpha olefin monomers as comonomer.

It is especially preferred that the component (A-2) contains either 1-butene and/or 1-hexene as comonomer. Mostly preferred is 1-hexene as comonomer for component (A-2).

The content of units derived from at least one alpha olefin comonomer having from 3 to 12 carbon atoms in component (A-2) is preferably 1.0 mol % to 2.5 mol %, more preferably 1.2 to 2.0 mol %.

Further, component (A-2) is preferably present in the base resin in an amount of 60 to 45 wt.-%, more preferably 57 to 47 wt.-%, and most preferably 55 to 49 wt.-%, with respect to the base resin.

The weight ratio of the low molecular weight component (A-1) to the high molecular weight component (A-2) is from 40:60 to 55:45, preferably from 43:57 to 53:47, most preferably from 45:55 to 51:49.

Optionally, the ethylene copolymer further comprises a prepolymer fraction. The prepolymer fraction preferably is an ethylene homopolymer or copolymer. The optional prepolymer fraction is preferably present in an amount of 0 to 5 wt.-%, more preferably in an amount of 0.2 to 3.5 wt.-% and most preferably in an amount of 0.5 to 2.5 wt.-%.

As regards the amount of the different polyethylene components (A-1) and (A-2) in the ethylene copolymer and the weight ratios of components (A-1) and (A-2) the optional prepolymer fraction is counted to the amount and the weight of component (A-1).

In one embodiment of the present invention the ethylene copolymer consists only of above defined components (A-1) and (A-2).

In another embodiment of the present invention the ethylene copolymer consists of components (A-1) and (A-2) and a prepolymer fraction as defined above.

The base resin (A) preferably consists of the low molecular weight component (A-1), the high molecular weight component (A-2) and the optional prepolymer as the polymer components.

The base resin (A) preferably has a density of equal to or more than 945 $kg/m^3$, more preferably of equal to or more than 947 $kg/m^3$.

The base resin (A) preferably has a density of equal to or less than 955 $kg/m^3$, more preferably of equal to or less than 953 $kg/m^3$ and most preferably of equal to or less than 952 $kg/m^3$.

The content of units derived from at least one alpha olefin comonomer having from 3 to 12 carbon atoms in the base resin (A) is usually equal to or more than 0.5 mol %, preferably from 0.5 mol % to 2.0 mol %, more preferably from 0.6 mol % to 1.5 mol %, most preferably from 0.7 mol % to 1.0 mol %.

The base resin (A) is preferably present in the polyethylene composition in an amount of more than 80 wt %, more preferably in an amount of 85 to 99 wt %, most preferably in an amount of 90 to 98 wt %, based on the total amount of the polyethylene composition (100 wt %).

Polyethylene Composition

In addition to the base resin, the polymer composition may comprise and preferably comprises usual additives (C) for utilization with polyolefins, such as stabilizers (e.g. antioxidant agents), metal scavengers and/or UV-stabilizers, antistatic agents and utilization agents (such as processing aid agents). Preferably, the amount of these additives (C) is 10 wt % or below, more preferably 8 wt % or below, more preferably 5 wt % or below, of the composition (100 wt %).

Further preferred, the amount of additives (C) different from carbon black is 0 wt % to 1 wt %, more preferably 0.001 wt % to 0.8 wt %.

The polyethylene composition comprises carbon black (B) in an amount of 1.0 to 10 wt %, preferably 1.5 to 9.0 wt %, more preferably 1.8 to 8.0 wt %, still more preferably 1.8 to 7.0 wt %, still more preferably 1.8 to 5.0 wt %, still more preferably 1.8 to 4.5 wt % and most preferably 1.8 to 4.0 wt %, based on the total amount of the composition.

Carbon black (B) can be added to polymer composition as such (neat) or in form of so-called master batch (CBMB), in which carbon black, and optionally further additives (C) as defined above, are contained in concentrated form in a carrier polymer.

The optional carrier polymer of carbon black masterbatch is not calculated to the amount of the polymer components present in the polyethylene composition. In other words, it is to be understood that carbon black (B) and optional additive(s) (C) may be added to the polymer composition in form of a masterbatch, i.e. together with a carrier polymer. In such case the carrier polymer is not considered as polymer component(s), but is calculated into the amount (wt %) of carbon black (B) or, respectively, into the amount (wt %) of additive(s) (C).

The amount of the optional carrier polymer of the carbon black master batch is 0 to 5 wt % based on the total amount of the polymer composition (100 wt %).

The polyethylene composition according to the present invention has a melt flow rate $MFR_5$ (190° C., 5 kg) of equal to or more than 0.14 g/10 min, preferably equal to or more than 0.15 g/10 min, and most preferably equal to or more than 0.16 g/10 min.

Further, the polyethylene composition has a melt flow rate $MFR_5$ (190° C., 5 kg) of equal to or less than 0.30 g/10 min, preferably equal to or less than 0.27 g/10 min, most preferably equal to or less than 0.25 g/10 min.

The polyethylene composition according to the present invention preferably has a melt flow rate $MFR_{21}$ (190° C., 21.6 kg) of equal to or more than 5.0 g/10 min, more preferably equal to or more than 5.5 g/10 min.

Further, the polyethylene composition preferably has a melt flow rate $MFR_{21}$ (190° C., 21.6 kg) of equal to or less than 8.0 g/10 min, preferably equal to or less than 7.7 g/10 min, and most preferably equal to or less than 7.4 g/10 min.

The polyethylene composition preferably has a flow rate ratio $FRR_{21/5}$, which is the ratio of $MFR_{21}$ to $MFR_5$, of 30 to 40, more preferably of 32 to 38.

Further, the polyethylene composition preferably complies with the in equation (III):

$$\frac{MFR2(A\text{-}1)}{MFR21(comp)} \geq 35.0 \quad \text{(III)}$$

with $MFR_2$(A-1) referring to said melt flow rate $MFR_2$ (190° C., 2.16 kg) of the low molecular weight component (A-1) and $MFR_{21}$(comp) referring to the melt flow rate $MFR_{21}$ (190° C., 21.6 kg) of the composition.

Still further, the polyethylene composition preferably complies with the in-equation (IV):

$$\frac{MFR2(A\text{-}1)}{MFR5(comp)} \leq 2000 \quad \text{(IV)}$$

with $MFR_2$(A-1) referring to said melt flow rate $MFR_2$ (190° C., 2.16 kg) of the low molecular weight component (A-1) and $MFR_5$(comp) referring to the melt flow rate $MFR_5$ (190° C., 5 kg) of the composition.

The $MFR_2$ (190° C., 2.16 kg), $MFR_5$ (190° C., 5 kg) and the $MFR_{21}$ (190° C., 21.6 kg) are determined according to ISO 1133.

The flow rate ratio, as well as in-equations (III) and (IV) show a measure for the broadness of the molecular weight distribution curve, based on the melt flow rate measurement. The bigger the results the broader is the molecular weight distribution.

The polyethylene composition according to the present invention preferably has a density of equal to or more than 953 to equal to or less than 967 kg/m³, more preferably of equal to or more than 956 to equal to or less than 963 kg/m³, determined according to ISO 1183-1:2004.

The polyethylene composition preferably has a shear thinning index $SHI_{2.7/210}$ of 70 to 130, more preferably a shear thinning index $SHI_{2.7/210}$ of 75 to 125, and most preferably a shear thinning index $SHI_{2.7/210}$ of 80 to 120.

The polyethylene composition preferably has a shear thinning index $SHI_{5/200}$ of 40 to 90, more preferably a shear thinning index $SHI_{5/200}$ of 45 to 80, and most preferably a shear thinning index $SHI_{5/200}$ of 50 to 75.

The shear thinning indexes $SHI_{2.7/210}$ and $SHI_{5/200}$ are a rheological measure indicating the broadness of the polymer. Thus SHI can be modified e.g. by varying the relative amounts of low and high molecular weight material (via split of the reactors) and/or by varying the molecular weights of the respective low and high molecular weight materials for example by variation of the chain transfer agent feed, as evident to a skilled person.

The polyethylene composition has a viscosity $eta_{747}$ of equal to or more than 800 kPas, more preferably of equal to or more than 850 kPas.

The viscosity $eta_{747}$ of the polyethylene composition is preferably equal to or less than 1300 kPas, most preferably equal to or less than 1250 kPas.

The viscosity $eta_{747}$ is measured at a very low, constant shear stress of 747 Pa and is inversely proportional to the gravity flow of the polyethylene composition. I.e. the higher $eta_{747}$ the lower the sagging of the polyethylene composition. Herein the higher $eta_{747}$ indicates the presence of high molecular weight polymer chains and higher molecular weight Mz and also higher Mw.

The polyethylene composition according to the present invention preferably has a complex viscosity at 0.05 rad/s eta* of 170 kPa·s to 270 kPa·s, more preferably 180 kPa·s to 260 kPa·s, and most preferably 190 kPa·s to 250 kPa s.

The viscosity $eta_{0.05}$ is measured at a low frequency and thus a low shear stress and is proportional to the molecular weight of the composition. It can thus be seen as a measure for the molecular weight of the composition.

The polyethylene composition according to the present invention preferably has a complex viscosity at 300 rad/s eta* of 1250 Pa·s to 3000 Pa·s, more preferably 1350 Pa·s to 2750 Pa·s, and most preferably 1500 Pa·s to 2500 Pa·s.

The viscosity $eta_{300}$ is measured at a high frequency and thus a high shear stress and is inversely proportional to the flowability of the composition. It can thus be seen as a measure for the processability of the composition. The polyethylene composition complies with in-equation (I)

$$eta_{747} \text{ [kPa*s]} > -1800 \times MFR_5 \text{ [g/10 min]} + 1200 \quad \text{(I)}$$

with $eta_{747}$ referring to said viscosity at a constant shear stress of 747 Pa of the polyethylene composition and $MFR_5$ referring to said melt flow rate $MFR_5$ (190° C., 5 kg) of the polyethylene composition.

In-equation (I) shows a correlation of the sagging tendencies and the flowability and processability of the polyethylene composition of the present invention. Since $eta_{747}$ is related and proportional to the molecular weight of the composition, it is inversely proportional to the melt flow rate. Thus, a polyethylene composition complying with in-equation (I) surprisingly shows high $eta_{747}$- and high $MFR_5$-values indicating a high molecular weight and low sagging tendencies together with a high flowability and extrudability.

Further, the polyethylene composition preferably complies with in-equation (II)

$$\frac{Eta747}{Eta0.05} \geq 3.8 \quad \text{(II)}$$

$eta_{747}$ referring to the viscosity at a constant shear stress of 747 Pa of the polyethylene composition and $eta_{0.05}$ referring to the complex viscosity at the frequency of 0.05 rad/s of the polyethylene composition.

Whereas $eta_{747}$ is measured at a low constant shear stress, $eta_{0.05}$ is determined using a dynamic shear measurement at a low frequency. Thus, both $eta_{747}$ and $eta_{0.05}$ relate to the molecular weight of the polyethylene composition whereby $eta_{0.05}$ is subjected to a slightly higher shear stress compared to $eta_{747}$ and more influenced by the amounts of polyethylene with higher chain length.

The polyethylene composition according to the present invention preferably has a weight average molecular weight, Mw, in the range of 200 to 450 kg/mol, more preferably 220 to 400 kg/mol.

The polyethylene composition of the invention with the specific property balance between density, MFR and viscosity at low shear stress provide not only low sagging behavior but also highly advantageous mechanical properties e.g. for pipe applications, and processability properties, when the polyethylene composition is processed to articles, preferably pipes, as well as desirable resistance to internal pressure when tested using pipe samples of the polyethylene composition.

The composition according to the present invention preferably has a tensile modulus, determined according to ISO 527-2:1993 at a temperature of 23° C. of equal to or less than 1250 MPa, more preferably of equal to or less than 1200 MPa, and most preferably of equal to or less than 1100 MPa. The lower limit of the tensile modulus at 23° C. is usually not lower than 800 MPa, preferably not lower than 950 MPa.

Further, the composition preferably has a Charpy Notched Impact Strength, determined according to ISO179/1eA:2000 at −20° C. of at least 7.5 kJ/m$^2$, more preferably of at least 10 kJ/m$^2$. The upper limit of the Charpy Notched Impact Strength at −20° C. is usually not more than 50 kJ/m$^2$, preferably not more than 30 kJ/m$^3$.

Still further, the composition preferably has a Charpy Notched Impact Strength, determined according to ISO179/1eA:2000 at 23° C. of at least 15 kJ/m$^2$, more preferably of at least 20 kJ/m$^2$ and most preferably of at least 25 kJ/m$^2$. The upper limit of the Charpy Notched Impact Strength at 23° C. is usually not more than 70 kJ/m$^2$, preferably not more than 50 kJ/m$^3$.

In a further aspect, the present invention is concerned with a polyethylene composition obtainable by a multistage process, the multistage process comprising
a) polymerizing ethylene in the presence of a Ziegler-Natta catalyst for obtaining an intermediate material having a melt flow rate MFR$_2$ (190° C., 2.16 kg) of equal to or more than 150 g/10 min to equal to or less than 400 g/10 min, determined according to ISO 1133,
b) transferring the intermediate material to a gas phase reactor
   (i) feeding ethylene and an alpha-olefin comonomer having from 3 to 12 carbon atoms to the gas phase reactor
   (ii) further polymerizing the intermediate material to obtain a base resin (A) which comprises the intermediate material polymerized in step a) and a material polymerized in step b) which has a higher weight average molecular weight as the intermediate material of step a), wherein the base resin (A) has a density of equal to or more than 943 kg/m$^3$ to equal to or less than 957 kg/m$^3$, determined according to ISO 1183,
c) extruding the base resin (A) in the presence of 1 to 10 wt % carbon black (B), based on the amount of the polyethylene composition, and optional further additive(s) (C), into a polyethylene composition having a melt flow rate MFR$_5$ (190° C., 5 kg) of equal to or more than 0.14 g/10 min to equal to or less than 0.30 g/10 min, determined according to ISO 1133, a viscosity at a constant shear stress of 747 Pa, $eta_{747}$, of equal to or more than 800 kPa*s to equal to or less than 1300 kPa*s, and complying with the in-equation (I)

$$eta_{747} > -1800 \times MFR_5 + 1200 \qquad (I)$$

with $eta_{747}$ referring to said viscosity at a constant shear stress of 747 Pa of the polyethylene composition and MFR$_5$ referring to said melt flow rate MFR$_5$ (190° C., 5 kg) of the polyethylene composition.

The base resin (A) and the polyethylene composition obtainable by the above described multistage process are preferably further defined by the properties of the base resin (A) and the polyethylene composition described above or in claims.

Most preferably the polyethylene composition consists of the base resin (A), carbon black (B) and optional further additives other than carbon black (C).

Article

In yet a further aspect, the present invention is concerned with an article comprising, preferably consisting of, the polyethylene composition as described above or below in claims.

Thereby, in the preferred embodiment of the present invention the article is a pipe or pipe fitting comprising, preferably consisting of, the polyethylene composition as described above or below in claims. Most preferably the article is a pipe, especially a pipe with a wall thickness of at least 100 mm.

The pipe preferably meets PE100 standards.

Process

In a further aspect the present invention relates to a process for producing the polyethylene composition according to the present invention, wherein the base resin (A) is produced in a multi-stage process comprising two reactors connected in series.

Usually, a multi-stage process is a process which makes use of at least two reactors, one for producing a lower molecular weight component (A-1) and a second for producing a higher molecular weight component (A-2). These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Multimodal polyethylene compositions of the present invention are produced in a multistage process, where lower molecular weight and higher molecular weight polymers (components A-1 and A-2) are produced in different, sequential polymerization steps, in any order.

A high molecular weight (HMW) polymer component (=relatively low density) (A-2) can be prepared in the first polymerization step and a low molecular weight (LMW) polymer component (=relatively high density) (A-1) in the second polymerization step. This can be referred to as the reverse mode. Alternatively, the low molecular weight polymer component (A-1) can be prepared in the first polymerization step and the high molecular weight polymer component (A-2) in the second polymerization step. This can be referred to as the normal mode and is preferred.

A two-stage process can, for example be a slurry-slurry or a gas phase-gas phase process, particularly preferably a slurry-gas phase process. Optionally the process according to the invention can comprise one or two additional polymerization steps.

The slurry and gas phase stages may be carried out using any conventional reactors known in the art. A slurry phase polymerization may, for example, be carried out in a continuously stirred tank reactor; a batchwise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

The slurry and gas phase processes are well known and described in the prior art.

In a preferred embodiment of the invention the low molecular weight (LMW) component (A-1) is produced first and the high molecular weight (HMW) component (A-2) is produced in the presence of LMW component (A-1). In this case the LMW component is the first polyethylene component (A-1) and the HMW component is the second polyethylene component (A-2).

The polymerisation catalysts for the production of the base resin may include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a MgCl$_2$-based ZN catalyst.

The Ziegler-Natta catalyst further preferably comprises a group 4 (group numbering according to new IUPAC system) metal compound, preferably titanium, magnesium dichloride and aluminum.

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina, and silica-titania. Preferably, the support is silica.

The average particle size of the silica support can be typically from 1 to 1000 mm, typically from 10 to 100 mm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP 688794, WO 99/51646 or WO 01/55230.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal polyethylene composition according to the invention is a bimodal polyethylene mixture consisting of polymer components (A-1) and (A-2), optionally further comprising a small prepolymerisation fraction. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C. The pressure in the loop reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

The ethylene content in the fluid phase of the slurry in the slurry phase reactor may be from 0.5 to 50% by mole, preferably from 1 to 20% by mole, and in particular from 2 to 10% by mole.

In a preferred embodiment of a gas phase reactor, the polymerization takes place in a fluidised bed gas phase reactor where an olefin is polymerised in the presence of a polymerisation catalyst in an upwards moving gas stream. The reactor typically contains a fluidised bed comprising the growing polymer particles containing the active catalyst located above a fluidisation grid. The polymer bed is fluidised with the help of a fluidisation gas comprising the olefin monomer, eventually comonomer(s), eventually chain growth controllers or chain transfer agents, such as hydrogen, and eventually inert gas.

Also antistatic agent(s) may be introduced into the gas phase reactor if needed. Suitable antistatic agents and methods to use them are disclosed, amongst others, in U.S. Pat. Nos. 5,026,795, 4,803,251, 4,532,311, 4,855,370 and EP-A-560 035. They are usually polar compounds and include, amongst others, water, ketones, aldehydes alcohols.

A chain-transfer agent, preferably hydrogen, is added as required to the reactors, and preferably 350 to 800 moles of $H_2$/kmoles of ethylene are added to the reactor, when the LMW component (A-1) is produced in this reactor, and 0 to 100 moles of $H_2$/kmoles of ethylene are added to the gas phase reactor when this reactor is producing the HMW component (A-2).

The polymerization process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C. and more preferably from 45° C. to 75° C.

The pressure is not critical and is typically from 1 bar to 150 bar, preferably from 10 bar to 100 bar.

The amount of monomer is typically such that from 0.1 grams to 1000 grams of monomer per one gram solid catalyst component is polymerised in the pre-polymerisation step. As the person skilled in the art knows, the catalyst particles recovered from a continuous pre-polymerisation reactor do not all contain the same amount of pre-polymer. Instead, each particle has its own characteristic amount which depends on the residence time of that particle in the pre-polymerisation reactor. As some particles remain in the reactor for a relatively long time and some for a relatively short time, then also the amount of pre-polymer on different particles is different and some individual particles may contain an amount of pre-polymer which is outside the above limits. However, the average amount of pre-polymer on the catalyst typically is within the limits specified above.

In addition to ethylene monomer it is possible to use one or more alpha-olefin comonomers in the pre-polymerisation step if desired. Suitable comonomers are, for example, 1-butene, 1-hexene, 4-methyl-1-pentene, 1-octene and their mixtures.

It is however preferred that in the pre-polymerization step an ethylene homopolymer prepolymer fraction is polymerized.

The molecular weight of the pre-polymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the pre-polymerisation step. However, where the solid catalyst component and the cocatalyst can be fed separately it is possible that only a part of cocatalyst is introduced into the pre-polymerisation stage and the remaining part into the subsequent polymerisation stages. Also in such cases it is necessary to introduce as much cocatalyst into the pre-polymerisation stage as necessary to obtain a sufficient polymerisation reaction.

The polymerization conditions as well as the feed streams and the residence time in the reactors are preferably adapted as such to produce a base resin (A) as described above or in the claims below.

Carbon Black (B), and optionally additives (C) or other polymer components, are added to the composition during the compounding step in the amount as described above. Preferably, the polyethylene composition of the invention obtained from the reactor is compounded in the extruder together with carbon black (B) and optional additives (C) in a manner known in the art.

The composition of the invention, preferably if produced in a process comprising a compounding step, wherein the composition, i.e. the blend, which is typically obtained as a polyolefin base resin powder from the reactor, is extruded in an extruder and then pelletized to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Preferably the process according to the invention comprises the following steps:
a) polymerizing ethylene in the presence of a Ziegler-Natta catalyst for obtaining an intermediate material having a melt flow rate $MFR_2$ (190° C., 2.16 kg) of equal to or more than 150 g/10 min to equal to or less than 400 g/10 min, determined according to ISO 1133,
b) transferring the intermediate material to a gas phase reactor (i) feeding ethylene and an alpha-olefin comonomer having from 3 to 12 carbon atoms to the gas phase reactor (ii) further polymerizing the intermediate material to obtain a base resin (A) which comprises the intermediate material polymerized in step a) and a material polymerized in step b) which has a higher weight average molecular weight as the intermediate material of step a), wherein the base resin (A) has a density of equal to or more than 943 kg/m³ to equal to or less than 957 kg/m³, determined according to ISO 1183, c) extruding the base resin (A) in the presence of 1 to 10 wt % carbon black (B), based on the amount of the polyethylene composition, and optional further additive(s) (C), into a polyethylene composition having a melt flow rate $MFR_5$ (190° C., 5 kg) of equal to or more than 0.14 g/10 min to equal to or less than 0.30 g/10 min, determined according to ISO 1133, a viscosity at a constant shear stress of 747 Pa, $eta_{747}$, of equal to or more than 800 kPa*s to equal to or less than 1300 kPa*s, and complying with the in-equation (I)

$$eta_{747} > -1800 \times MFR_5 + 1200 \tag{I}$$

with $eta_{747}$ referring to said viscosity at a constant shear stress of 747 Pa of the polyethylene composition and $MFR_5$ referring to said melt flow rate $MFR_5$ (190° C., 5 kg) of the polyethylene composition.

The base resin (A) and the polyethylene composition produced by the above described multistage process are preferably further defined by the properties of the base resin (A) and the polyethylene composition described above or in claims.

Most preferably the polyethylene composition consists of the base resin (A), carbon black (B) and optional further additives other than carbon black (C).

Use

Furthermore, the present invention relates to an article, preferably a pipe or pipe fitting, preferably pipe, and to the use of such a polyethylene composition for the production of an article, preferably a pipe or pipe fitting, most preferably a pipe. Especially preferred are pipes with a wall thickness of at least 100 mm.

The pipe preferably meets PE100 standards.

Pipes can be produced from the polyethylene composition according to the present invention according to the methods known in the art. Thus, according to one preferred method the polyethylene composition is extruded through an annular die to a desired internal diameter, after which the polyethylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

The fittings can be produced by conventional moulding processes, like injection moulding processes, which are well known to a skilled person.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in kg/m³.

c) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]} and the RSHEPT decoupling scheme {[4], [5]}. A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (\tfrac{1}{2})*(I_{2S} + I_{3S})$$

The relative content of ethylene was quantified using the integral of the bulk methylene (δ+) signals at 30.00 ppm:

$$E = (1/2)*I_{\delta+}$$

The total ethylene comonomer content was calculated based on the bulk methylene signals and accounting for ethylene units present in other observed comonomer sequences or end-groups:

$$E_{total} = E + (5/2)*B + (3/2)*S$$

The total mole fraction of 1-hexene in the polymer was then calculated as:

$$fH = (H_{total})/(E_{total} + H_{total})$$

The total comonomer incorporation of 1-hexene in mole percent was calculated from the mole fraction in the usual manner:

$$H[\text{mol }\%] = 100*fH$$

The total comonomer incorporation of 1-hexene in weight percent was calculated from the mole fraction in the standard manner:

$$H[\text{wt }\%] = 100*(fH*84.16)/((fH*84.16) + ((1-fH)*28.05))$$

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Reson. 2005, 176, 239.
[5] Griffin, J. M., Tripon, C., Samoson, A., Filip, C., and Brown, S. P., Mag. Res. in Chem. 2007, 45, S1, S198.
[6] Castignolles, P., Graf, R., Parkinson, M., Wilhelm, M., Gaborieau, M., Polymer 50 (2009) 2373.
[7] Zhou, Z., Muemmerle, R., Qiu, X., Redwine, D., Cong, R., Taha, A., Baugh, D. Winniford, B., J. Mag. Reson. 2007, 187, 225.
[8] Busico, V., Carbonniere, P., Cipullo, R., Pellecchia, R., Severn, J., Talarico, G., Macromol. Rapid Commun. 2007, 28, 1128.
[9] J. Randall, Macromol. Sci., Rev. Macromol. Chem. Phys. 1989, C29, 201.

d) Dynamic Shear Measurements (Frequency Sweep Measurements)

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.0154 and 500 rad/s and setting a gap of 1.2 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \tag{1}$$

If the applied strain is within the linear viscoelastic regime, the resulting sinusoidal stress response can be given by $$\sigma(t) = \sigma_0 \sin(\omega t + \delta) \tag{2}$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η", and the loss tangent, tan η, which can be expressed as follows:

$$G' = \frac{\sigma_0}{\gamma_0}\cos\delta \, [\text{Pa}] \tag{3}$$

$$G'' = \frac{\sigma_0}{\gamma_0}\sin\delta \, [\text{Pa}] \tag{4}$$

$$G^* = G' + iG'' \, [\text{Pa}] \tag{5}$$

$$\eta^* = \eta' - i\eta'' \, [\text{Pa} \cdot \text{s}] \tag{6}$$

$$\eta' = \frac{G''}{\omega} \, [\text{Pa} \cdot \text{s}] \tag{7}$$

$$\eta'' = \frac{G'}{\omega} \, [\text{Pa} \cdot \text{s}] \tag{8}$$

Besides the above mentioned rheological functions one can also determine other rheological parameters such as the so-called elasticity index EI(x). The elasticity index EI(x) is the value of the storage modulus, G', determined for a value of the loss modulus, G", of x kPa and can be described by equation 9.

$$EI(x) = G' \text{ for } (G''=x\text{kPa}) \, [\text{Pa}] \tag{9}$$

For example, the EI(5 kPa) is defined by the value of the storage modulus G', determined for a value of G" equal to 5 kPa.

The determination of so-called Shear Thinning Indexes is done, as described in equation 10.

$$SHI_{(x/y)} = \frac{Eta^* \text{ for } (G^* = x \text{ kPa})}{Eta^* \text{ for } (G^* = y \text{ kPa})} \quad (10)$$

For example, the $SHI_{(2.7/210)}$ is defined by the value of the complex viscosity, in Pa·s, determined for a value of G* equal to 2.7 kPa, divided by the value of the complex viscosity, in Pa·s, determined for a value of G* equal to 210 kPa. Accordingly, the $SHI_{(5/200)}$ is defined by the value of the complex viscosity, in Pa·s, determined for a value of G* equal to 5 kPa, divided by the value of the complex viscosity, in Pa·s, determined for a value of G* equal to 200 kPa.

The values of storage modulus (G'), loss modulus (G"), complex modulus (G*) and complex viscosity (η*) were obtained as a function of frequency (ω).

Thereby, e.g. $\eta^*_{300\ rad/s}$ (eta*$_{300\ rad/s}$) is used as abbreviation for the complex viscosity at the frequency of 300 rad/s and $\eta^*_{0.05\ rad/s}$ (eta*$_{0.05\ rad/s}$) is used as abbreviation for the complex viscosity at the frequency of 0.05 rad/s.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

e) Eta 747 Pa

One method which correlates well with the sagging properties, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a rotational rheometer, which can be a constant stress rheometer as for example an Anton Paar MCR Series Rheometer. Rheometers and their function have been described in "Encyclopedia of Polymer Science and Engineering", 2nd Ed., Vol. 14, pp. 492-509. The measurements are performed under a constant shear stress between two 25 mm diameter plates (constant rotation direction). The gap between the plates is 1.2 mm. An 1.2 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

f) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

g) Tensile Modulus (23° C.)

As a measure for stiffness, the tensile modulus (E-modulus) of the compositions was measured at 23° C. on compression molded specimens according to ISO 527-2:1993. The specimens (1B type) were cut from plaques of 4 mm thickness prepared by compression molding according to ISO 293:2004 using the conditions defined in chapter 3.3 of ISO 1872-2:2007. The modulus was measured at a speed of 1 mm/min.

h) Tensile Properties (23° C.)

The tensile strength at break and elongation at break (i.e. tensile strain at break) is measured according to ISO 527-1 (cross head speed 50 mm/min) at a temperature of 23° C.

i) Charpy Notched Impact Strength

Charpy impact strength is determined according to ISO179/1eA:2000 on V-notched samples of 80*10*4 mm$^3$ at −30° C. (Charpy impact strength (−30° C.)), at −20° C. (Charpy impact strength (−20° C.)) and at 23° C. (Charpy impact strength (23° C.)). Samples were cut from plaques of 4 mm thickness prepared by compression molding according to ISO 293:2004 using the conditions defined in chapter 3.3 of ISO 1872-2:2007.

j) Measure of Homogeneity/White Spot Rating (WSR)

The white spot rating of the compounded composition is determined according to ISO 18 553/2002-03-01 as follows:

Pellets of the composition which are obtained after a single compounding step are analysed by collecting 6 different pellets where from each pellet, one cut is used (thickness cut 20±2 μm). The cut for the measurement of the white spot rating should be taken near the middle of the pellet (sample) with rotation microtome Type Leica RM2265. Preferably, the cut is in flow direction of the melt through the whole of the pelletizer.

The cuts are evaluated at a magnification of 100× and the size and the number of the non-coloured inclusions ("white-spots"=non-pigmented, high molecular weight agglomerates/particles in the polymer) on the total area of each cut are determined. All white spots with a diameter of >5 μm are counted. Transmission light microscope Olympus BX41 with XYZ motorised stage from Märzhäuser and particle inspector Software from Olympus was used.

The white spot rating test "homogeneity" is based on the ISO 18553/2002-03-01. In this test, inhomogeneities of the composition, present after a single compounding step as described above, which appear as white spots, are determined and rated according to the rating scheme given in ISO 18553/2002-03-01. The lower the composition is rated (less amount of high molecular weight particles) in this test, the better is the homogeneity of the composition.

k) Pressure Test on Un-notched Pipes (PT); Resistance to Internal Pressure

The resistance to internal pressure has been determined in a pressure test on pressure test on un-notched 32 mm SDR 11 pipes having a length of 450 mm is carried out in water-inside and water-outside environment according to ISO 1167-1:2006. End caps of type A were used. The time to failure is determined in hours. The following conditions were applied: hoop stress of 5.5 MPa at a temperature of 80° C.

2. Materials a) Preparation of the Polymerization Catalyst for Inventive Examples Ex1-3

The catalyst was prepared as described in Example 1 of WO-A-99/51646.

b) Inventive Example Ex1

Into a first loop reactor having a volume of 50 dm$^3$ and operating at a temperature of 70° C. and a pressure of 57 bar propane ($C_3$, 50 kg/h), ethylene ($C_2$, 2 kg/h), and hydrogen ($H_2$, 5 g/h) were introduced for conducting a pre-polymerization step. In addition the Ziegler-Natta catalyst prepared as described above under a) was introduced into the reactor together with triethylaluminium cocatalyst so that the ratio of aluminium to titanium was 3 mol/mol. The polymerization rate was 1.9 kg/h.

The slurry was withdrawn intermittently from the prepolymerization reactor and directed to a second loop reactor having a volume of 500 dm$^3$ and operating at a temperature of 95° C. and a pressure of 56 bar. Additionally, propane, ethylene and hydrogen were fed to the second loop reactor whereby the ethylene concentration and the hydrogen to ethylene ratio for example Ex 1 are listed in Table 1. The production split, the density and melt index of the polymer fractions produced in the second loop reactor are listed in Table 1.

The slurry was withdrawn intermittently from the second loop reactor by using settling legs and directed to a gas phase reactor. The gas phase reactor was operated at a temperature of 85° C. and a pressure of 20 bar. Additional ethylene, 1-hexene comonomer ($C_6$), and hydrogen were fed whereby the ethylene concentration, the 1-hexene to ethylene ratio and the hydrogen to ethylene ratio as well as the production split and the density of the polymers of example Ex 1 withdrawn from the gas phase reactor are listed in Table 1.

The resulting polymer was purged with nitrogen (about 50 kg/h) for one hour, stabilised with commercial stabilisers, 1100 ppm of Irganox 1010, 1100 ppm Irgafos 168 and 1100 ppm Ca-stearate and then extruded together with 2.3 wt % carbon black to pellets in a counter-rotating twin screw extruder CIM90P (manufactured by Japan Steel Works) in adiabatic mode i.e. barrels were not controlled by external heating/cooling The properties of the compounded composition are shown in Table 2.

c) Inventive Examples Ex2 and Ex3

For inventive examples Ex2 and Ex3 the same polymerization catalyst and the same principle multistage process were used as for Ex1. The polymerization conditions where varied as listed in Table 1.

The properties of the compounded compositions are shown in Table 2.

d) Comparative Examples CE1 and CE2

For comparative examples CE1 and CE2 the same principle multistage process was used as for Ex1. As catalyst commercially available, solid polymerisation catalyst component Lynx 200™ sold by BASF Catalyst LLC was introduced into the first loop reactor together with triethylaluminium cocatalyst so that the ratio of aluminium to titanium was 15 mol/mol. The polymerization conditions where varied as listed in Table 1.

The properties of the compounded compositions are shown in Table 2.

e) Comparative Example CE3

As comparative example CE3 commercially available black bimodal HDPE grade for PE100 pipes HDF145B sold by Qenos Pty. Ltd. has been tested. The properties of the PE100 HDPE resin are shown in Table 2.

f) Pipe Extrusion

The compounded compositions of Inventive Examples Ex1, Ex2 and E3 and Comparative Examples CE1, CE2 and CE3 were extruded to SDR 11 pipes for the pressure resistance tests in a Battenfeld 1-60-35-B extruder at a screw speed of about 200 rpm, and the conditions as listed in Table 2. The temperature profile in each barrel zone was 220/210/210/210/210° C.

TABLE 1

Polymerization conditions

|  | CE1 | CE2 | Ex 1 | Ex 2 | Ex 3 |
|---|---|---|---|---|---|
| Prepolymerizer: |  |  |  |  |  |
| Temperature [° C.] | 60 | 60 | 70 | 70 | 70 |
| Pressure [bar] | 65 | 65 | 57 | 57 | 57 |
| Split [wt %] | 2.3 | 2.3 | 1.5 | 1.1 | 2.2 |
| Loop: |  |  |  |  |  |
| Temperature [° C.] | 95 | 95 | 95 | 95 | 95 |
| Pressure [bar] | 65 | 65 | 56 | 56 | 56 |
| $H_2/C_2$ [mol/kmol] | 1050 | 960 | 490 | 500 | 630 |
| $C_2$-concentration [mol %] | 2.6 | 2.6 | 4.3 | 5.3 | 7.3 |
| Production Rate [kg/h] | 37 | 37 | 54 | 50 | 48 |
| Split [wt %] | 48.7 | 48.7 | 48.5 | 45.9 | 47.8 |
| $MFR_2$ [g/10 min] | 325 | 325 | 360 | 290 | 220 |
| Density [kg/m$^3$] | 970 | 970 | 970 | 970 | 970 |
| Gas phase: |  |  |  |  |  |
| Temperature [° C.] | 85 | 85 | 85 | 85 | 85 |
| Pressure [bar] | 20 | 20 | 20 | 20 | 20 |
| $H_2/C_2$ [mol/kmol] | 12.6 | 18.7 | 3.1 | 2.8 | 5.0 |
| $C_6/C_2$ [mol/kmol] | 68 | 68 | 34 | 34 | 31 |
| $C_2$-concentration [mol %] | 15 | 15 | 4.4 | 6.2 | 5.6 |
| Production Rate [kg/h] | 38 | 38 | 55 | 58 | 50 |
| Split [wt %] | 49 | 49 | 50 | 53 | 50 |
| Density [kg/m$^3$] | 949 | 949 | 950 | 949 | 950 |

TABLE 2

Composition properties

| Composition Properties: | CE1 | CE2 | CE3 | Ex 1 | Ex 2 | Ex 3 |
|---|---|---|---|---|---|---|
| Density [kg/m$^3$] | 962 | 961 | 961 | 962 | 960 | 961 |
| $MFR_5$ [g/10 min] | 0.16 | 0.23 | 0.17 | 0.20 | 0.17 | 0.16 |
| $MFR_{21}$ [g/10 min] | 6.2 | 8.0 | 6.6 | 7.4 | 5.8 | 5.8 |
| $FRR_{21/5}$ | 39 | 35 | 39 | 37 | 34 | 36 |
| WSR | 9.0 | 8.5 | n.d. | 9.9 | 4.8 | 9.4 |
| Eta (0.05 rad/s) [kPa · s] | 234 | 164 | 282 | 201 | 223 | 236 |
| Eta (300 rad/s) [Pa · s] | 1141 | 1047 | 1265 | 1531 | 2462 | 2271 |
| $SHI_{2.7/210}$ | 109 | 87 | 72 | 112 | 82 | 104 |
| $SHI_{5/200}$ | 69 | 58 | 49 | 69 | 52 | 63 |
| $Eta_{747}$ [kPa · s] | 868 | 547 | 870 | 878 | 932 | 1175 |
| $-1800 \times MFR_5 + 1200$ | 912 | 786 | 894 | 840 | 894 | 912 |
| $Eta_{747}/Eta$ (0.05 rad/s) | 3.7 | 3.3 | 3.1 | 4.4 | 4.2 | 5.0 |
| $MFR_2$ (Loop)/$MFR_{21}$ | 52 | 41 | n.d. | 49 | 50 | 38 |
| $MFR_2$ (Loop)/$MFR_5$ | 2031 | 1413 | n.d. | 1800 | 1706 | 1375 |
| Tensile Modulus [MPa] | 1040 | 1080 | 1300 | 1080 | 1020 | 1000 |
| Tensile Strength [MPa] | 28 | 28 | 37 | 29 | 30 | 27 |
| Elongation at break [%] | 640 | 650 | 760 | 620 | 640 | 590 |
| Charpy NIS (−30° C.) [kJ/m$^2$] | 12 | 10 | n.d. | n.d. | n.d. | n.d. |
| Charpy NIS (−20° C.) [kJ/m$^2$] | n.d. | n.d. | n.d. | 10 | 14 | 18 |
| Charpy NIS (23° C.) [kJ/m$^2$] | 36 | 33 | n.d. | 28 | 34 | 35 | n.d. not determined

Further the compounded compositions of Inventive Examples Ex1, Ex2 and Ex3 and Comparative Examples CE1, CE2 and CE3 were extruded to SDR 6 pipes with a diameter of 250 mm and a wall thickness of 41.5 mm for sagging tests in a Battenfeld 1-60-35-B extruder at a screw speed of about 200 rpm, and the conditions as listed in Table 2. The temperature profile in each barrel zone was 220/210/210/210/210° C.

The pipe tests are still in progress.

The invention claimed is:

1. Polyethylene composition consisting of:
   a base resin (A) comprising
   a copolymer of ethylene and at least one comonomer selected from alpha-olefins having from three to twelve carbon atoms,
   wherein the ethylene copolymer comprises a low molecular weight component (A-1) and a high molecular weight component (A-2) with the low molecular weight component (A-1) having a lower weight average molecular weight than the high molecular weight component (A-2), (B) carbon black in an amount of 1.0 to 10 wt % based on the total amount of the polyethylene composition, and (C) optional further additives other than carbon black which are antioxidants, metal scavengers, UV stabilizers, or antistatic agents;

wherein the low molecular weight component (A-1) has a melt flow rate $MFR_2$ (190° C., 2.16 kg) of equal to or more than 150 g/10 min to equal to or less than 400 g/10 min, determined according to ISO 1133, the base resin (A) has a density of equal to or more than 943 kg/m³ to equal to or less than 957 kg/m³, determined according to ISO 1183, and the composition has a melt flow rate $MFR_5$ (190° C., 5 kg) of equal to or more than 0.14 g/10 min to equal to or less than 0.30 g/10 min, determined according to ISO 1133, the composition has a complex viscosity at the frequency of 0.05 rad/s, $eta_{0.05}$, of 170 kPa*s to 270 kPa*s, a viscosity at a constant shear stress of 747 Pa, $eta_{747}$, of equal to or more than 800 kPa*s to equal to or less than 1300 kPa*s, and complies with the in-equation (I)

$$eta_{747}[kPa*s] > -1800 \times MFR_5[g/10 \text{ min}] + 1200 \quad (I)$$

with $eta_{747}$ referring to said viscosity at a constant shear stress of 747 Pa of the polyethylene composition and $MFR_5$ referring to said melt flow rate $MFR_5$ (190° C., 5 kg) of the polyethylene composition; and the composition has a flow rate ratio $FRR_{21/5}$, being the ratio of melt flow rate $MFR_{21}$ (190° C., 21.6 kg) to melt flow rate $MFR_5$ (190° C., 5 kg), determined according to ISO 1133, of 30 to 40.

2. The polyethylene composition according to claim 1, wherein the polyethylene composition complies with in-equation (II)

$$\frac{Eta747}{Eta0.05} \geq 3.8 \quad (II)$$

$eta_{747}$ referring to said viscosity at a constant shear stress of 747 Pa of the polyethylene composition and $eta_{0.05}$ referring to the complex viscosity at the frequency of 0.05 rad/s [kPa*s] of the polyethylene composition.

3. The polyethylene composition according to claim 1, wherein the composition has a shear thinning index $SHI_{2.7/210}$ of equal to or more than 70 to equal to or less than 130.

4. The polyethylene composition according to claim 1, wherein the low molecular weight component (A-1) is an ethylene homopolymer and the high molecular weight component (A-2) is a copolymer of ethylene and a comonomer selected from alpha-olefins having from three to twelve carbon atoms.

5. The polyethylene composition according to claim 1, wherein the weight ratio of the low molecular weight component (A-1) to the high molecular component (A-2) is from 40:60 to 55:45.

6. The polyethylene composition according to claim 1, wherein the composition has a melt flow rate $MFR_{21}$ (190° C., 21.6 kg) of 5.0 g/10 min to 8.0 g/10 min, determined according to ISO 1133.

7. The polyethylene composition according to claim claim 1, wherein the composition has a flow rate ratio $FRR_{21/5}$, being the ratio of melt flow rate $MFR_{21}$ (190° C., 21.6 kg) to melt flow rate MFRS (190° C., 5 kg), determined according to ISO 1133, of 32 to 38.

8. The polyethylene composition according to claim 1, wherein the composition has a density of equal to or more than 953 kg/m³ to equal to or less than 967 kg/m³, determined according to ISO 1183.

9. An article comprising the polyethylene composition according to claim 1.

10. The article according to claim 9 being a pipe or pipe fitting.

11. The article according to claim 10 being a pipe having a wall thickness of at least 100 mm.

12. The polyethylene composition of claim 1, wherein the complex viscosity at the frequency of 0.05 rad/s, $eta_{0.05}$, is 180 kPa*s to 260 kPa*s.

13. The polyethylene composition of claim 1, wherein the complex viscosity at the frequency of 0.05 rad/s, $eta_{0.05}$, is 190 kPa*s to 250 kPa*s.

14. The polyethylene composition of claim 1, wherein the polyethylene composition has a complex viscosity at the frequency of 300 rad/s of 1250 Pa*s to 3000 Pa*s.

15. A polyethylene composition obtainable by a multi-stage process, the process comprising the steps of a) polymerizing ethylene in the presence of a Ziegler-Natta catalyst for obtaining an intermediate material having a melt flow rate $MFR_2$ (190° C., 2.16 kg) of equal to or more than 150 g/10 min to equal to or less than 400 g/10 min, determined according to ISO 1133, b) transferring the intermediate material to a gas phase reactor (i) feeding ethylene and an alpha-olefin comonomer having from 3 to 12 carbon atoms to the gas phase reactor (ii) further polymerizing the intermediate material to obtain a base resin (A) which comprises the intermediate material polymerized in step a) and a material polymerized in step b) which has a higher weight average molecular weight as the intermediate material of step a), wherein the base resin (A) has a density of equal to or more than 943 kg/m³ to equal to or less than 957 kg/m³, determined according to ISO 1183, c) extruding the base resin (A) in the presence of 1 to 10 wt % carbon black (B), based on the amount of the polyethylene composition, and optional further additive(s) (C) which are antioxidants, metal scavengers, UV stabilizers, or antistatic agents, into a polyethylene composition having a melt flow rate $MFR_5$ (190° C., 5 kg) of equal to or more than 0.14 g/10 min to equal to or less than 0.30 g/10 min, determined according to ISO 1133, the composition has a complex viscosity at the frequency of 0.05 rad/s, $eta_{0.05}$, of 170 kPa*s to 270 kPa*s, a viscosity at a constant shear stress of 747 Pa, $eta_{747}$, of equal to or more than 800 kPa*s to equal to or less than 1300 kPa*s, and complying with the in-equation (I)

$$eta_{747} > -1800 \times MFR_5 + 1200 \quad (I)$$

with $eta_{747}$ referring to said viscosity at a constant shear stress of 747 Pa of the polyethylene composition and $MFR_5$ referring to said melt flow rate $MFR_5$ (190° C., 5 kg) of the polyethylene composition;

the composition has a flow rate ratio $FRR_{21/5}$, being the ratio of melt flow rate $MFR_{21}$ (190° C., 21.6 kg) to melt flow rate $MFR_5$ (190° C., 5 kg), determined according to ISO 1133, of 30 to 40; and the polyethylene composition consists of the base resin (A), the carbon black (B), and the optional further additives (C).

16. The polyethylene composition according to claim 15, wherein the composition has a flow rate ratio $FRR_{21/5}$, being the ratio of melt flow rate $MFR_{21}$ (190° C., 21.6 kg) to melt flow rate $MFR_5$ (190° C., 5 kg), determined according to ISO 1133, of 30 to 40.

17. An article comprising the polyethylene composition according to claim 15.

18. The article according to claim 17 being a pipe or pipe fitting.

19. The article according to claim 18 being a pipe having a wall thickness of at least 100 mm.

20. A process for producing the polyethylene composition according to claim 1, wherein the base resin (A) is produced in a multi-stage process comprising two reactors connected in series.

* * * * *